(12) United States Patent
Ge et al.

(10) Patent No.: US 10,756,638 B2
(45) Date of Patent: Aug. 25, 2020

(54) TRANSFORMER BASED VARIABLE VOLTAGE CONVERTER

(71) Applicant: Ford Global Technologies, LLC, Dearborn, MI (US)

(72) Inventors: Baoming Ge, Okemos, MI (US); Lihua Chen, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 232 days.

(21) Appl. No.: 16/025,698

(22) Filed: Jul. 2, 2018

(65) Prior Publication Data

US 2020/0007045 A1  Jan. 2, 2020

(51) Int. Cl.
| | | |
|---|---|---|
| *H02M 3/335* | (2006.01) | |
| *H02P 27/06* | (2006.01) | |
| *H02M 3/158* | (2006.01) | |
| *H02M 7/5387* | (2007.01) | |
| *B60L 50/51* | (2019.01) | |

(52) U.S. Cl.
CPC ......... *H02M 3/33576* (2013.01); *B60L 50/51* (2019.02); *H02M 3/158* (2013.01); *H02M 7/5387* (2013.01); *H02P 27/06* (2013.01); *B60L 2210/14* (2013.01); *B60L 2210/40* (2013.01); *H02P 2201/09* (2013.01)

(58) Field of Classification Search
CPC ......... H02M 2001/0064; H02M 3/158; H02M 7/5387; H02M 2001/008; H02P 27/06; H02P 2201/09; B60L 2210/40; B60L 50/51; B60L 2210/14
See application file for complete search history.

(56) References Cited

U.S. PATENT DOCUMENTS

| | | | |
|---|---|---|---|
| 6,177,849 B1* | 1/2001 | Barsellotti | H04B 3/56 333/177 |
| 7,408,794 B2 | 8/2008 | Su | |
| 8,811,039 B2 | 8/2014 | The Ngo et al. | |
| 2012/0268969 A1 | 10/2012 | Cuk | |
| 2018/0334043 A1* | 11/2018 | Zou | H02J 3/16 |
| 2019/0181766 A1* | 6/2019 | Ge | H02M 1/14 |
| 2019/0366850 A1* | 12/2019 | Ge | H02M 1/15 |
| 2019/0379296 A1* | 12/2019 | Ge | H02M 7/483 |

\* cited by examiner

*Primary Examiner* — Jared Fureman
*Assistant Examiner* — Duc M Pham
(74) *Attorney, Agent, or Firm* — David B. Kelley; Brooks Kushman P.C.

(57) ABSTRACT

A vehicle electric drive includes a battery, an electric machine, and a variable voltage converter. The variable voltage converter includes switches, a transformer having a pair of windings sharing a common terminal with a series connected input capacitor, and an inductor electrically between the switches and transformer. The transformer and input capacitor are in parallel with the battery. The variable voltage converter is configured to boost voltage of the battery via operation of the switches.

16 Claims, 10 Drawing Sheets

TRANSFORMER BASED VARIABLE VOLTAGE CONVERTER

TECHNICAL FIELD

This disclosure relates to power electronics and associated circuitry for electrified vehicles.

BACKGROUND

Battery electric vehicles and hybrid-electric vehicles often include a traction battery to provide power to a traction motor for propulsion, and a power inverter therebetween to convert direct current (DC) power to alternating current (AC) power. The typical AC traction motor is a three-phase motor powered by three sinusoidal signals each driven with 120 degrees phase separation, but other configurations are also possible. Also, electrified vehicles include power electronics to condition and transfer power between the various power consuming and power producing/storing components.

SUMMARY

A vehicle electric drive includes a battery, an electric machine, and a variable voltage converter. The variable voltage converter includes switches, a transformer having a pair of windings sharing a common terminal with a series connected input capacitor, and an inductor electrically between the switches and transformer. The transformer and input capacitor are in parallel with the battery. The variable voltage converter is configured to boost voltage of the battery via operation of the switches.

A vehicle electric drive includes a battery, a motor and generator, and a variable voltage converter electrically between the battery and the motor and generator. The variable voltage converter includes a series connected transformer and capacitor in parallel with the battery such that operation of the variable voltage converter as internal resistance of the battery changes by an order of magnitude results in changes in peak-to-peak values of battery ripple current of less than 20%.

A method for operating a vehicle includes operating a variable voltage converter that is electrically between a battery and an electric machine. The variable voltage converter includes a series connected transformer and capacitor in parallel with the battery such that an order of magnitude change in internal resistance of the battery results in changes in peak-to-peak values of battery ripple current of less than 20%.

DETAILED DESCRIPTION

Various embodiments of the present disclosure are described herein. However, the disclosed embodiments are merely exemplary and other embodiments may take various and alternative forms that are not explicitly illustrated or described. The figures are not necessarily to scale; some features may be exaggerated or minimized to show details of particular components. Therefore, specific structural and functional details disclosed herein are not to be interpreted as limiting, but merely as a representative basis for teaching one of ordinary skill in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. However, various combinations and modifications of the features consistent with the teachings of this disclosure may be desired for particular applications or implementations.

Figure 1:
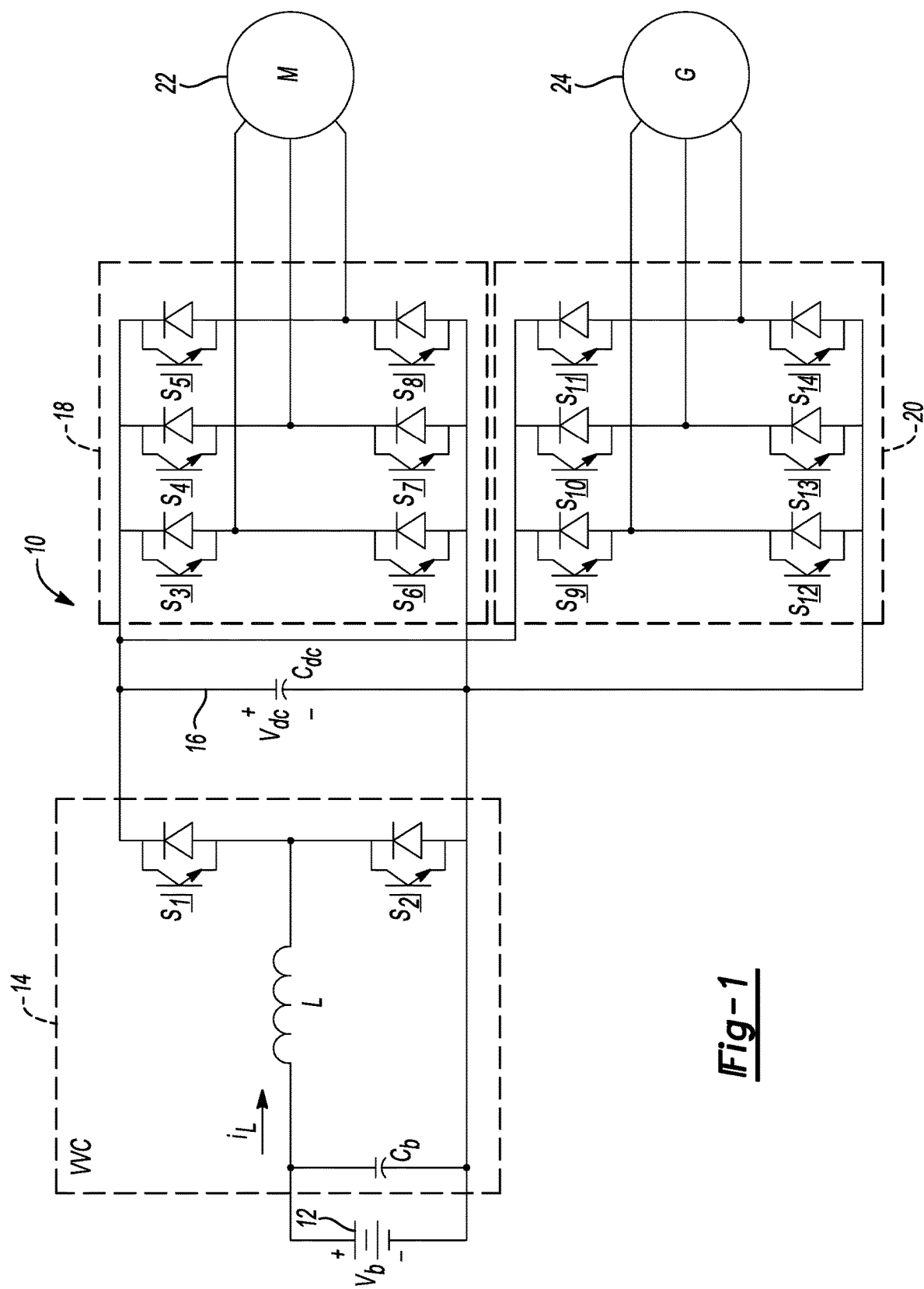
FIG. 1 is a schematic diagram of an electric drive system for a hybrid electric vehicle.

Referring to FIG. 1, an electric drive system 10 includes a traction battery 12, a variable voltage converter 14, DC bus 16, inverters 18, 20, motor 22, and generator 24. The variable voltage converter 14 includes an input capacitor Cb in parallel with the traction battery 12, switches S1, S2, and inductor L electrically between capacitor Cb and switches S1, S2. The DC bus 16 includes capacitor Cdc. The inverter 18 includes switches S3-S8, and the inverter 20 includes switches S9-S14.

Both the motor 22 and the generator 24 can operate in motoring or generating mode, with the former operation mode consuming power/energy and the latter operation mode producing power/energy. The variable voltage converter 14, motor 22, and generator 24 are coupled via the DC bus 16, where low voltage of the traction battery 12 is boosted by the variable voltage converter 14 to a high level for enhancing performance of the traction motor drive.

The variable voltage converter 14 needs the inductor L and input capacitor Cb to work together to limit battery current ripple within a required range. For high-power variable voltage converter applications, a large inductor L and large input capacitor Cb are usually necessary to achieve this purpose. As a result, the designed high-power variable voltage converter has high inductance, high capacitance, high volume, high weight, high cost, and high loss, which can reduce system value. Moreover, cooling and packaging these large components can be challenging.

Traction battery internal resistance and stray inductance significantly affect battery ripple current. Traction batteries typically have large resistance (e.g., 0.7Ω at −40° C.) at low temperature, and low resistance (e.g., 0.025Ω at 70° C.) at high temperature. When inductors and input capacitors for existing variable voltage converters are designed to meet battery ripple current requirements at low temperature, they cannot meet battery ripple current requirements at high temperature. And when inductors and input capacitors are designed to meet battery ripple current requirements at high temperature, they have large size. It is thus challenging to design a high-power variable voltage converter using a relatively small inductor and input capacitor, and maintain battery ripple current at a low level regardless of battery internal impedance.

Here, we propose a variable voltage converter to address the issues above. Because of the use of a transformer, the proposed variable voltage converter is called as transformer-based variable voltage converter. This variable voltage converter can reduce inductance and capacitance when compared with existing solutions. Moreover, battery ripple current is low even though battery internal impedance significantly changes in a wide range, which shows a robust performance against battery internal impedance changes.

Figure 2:
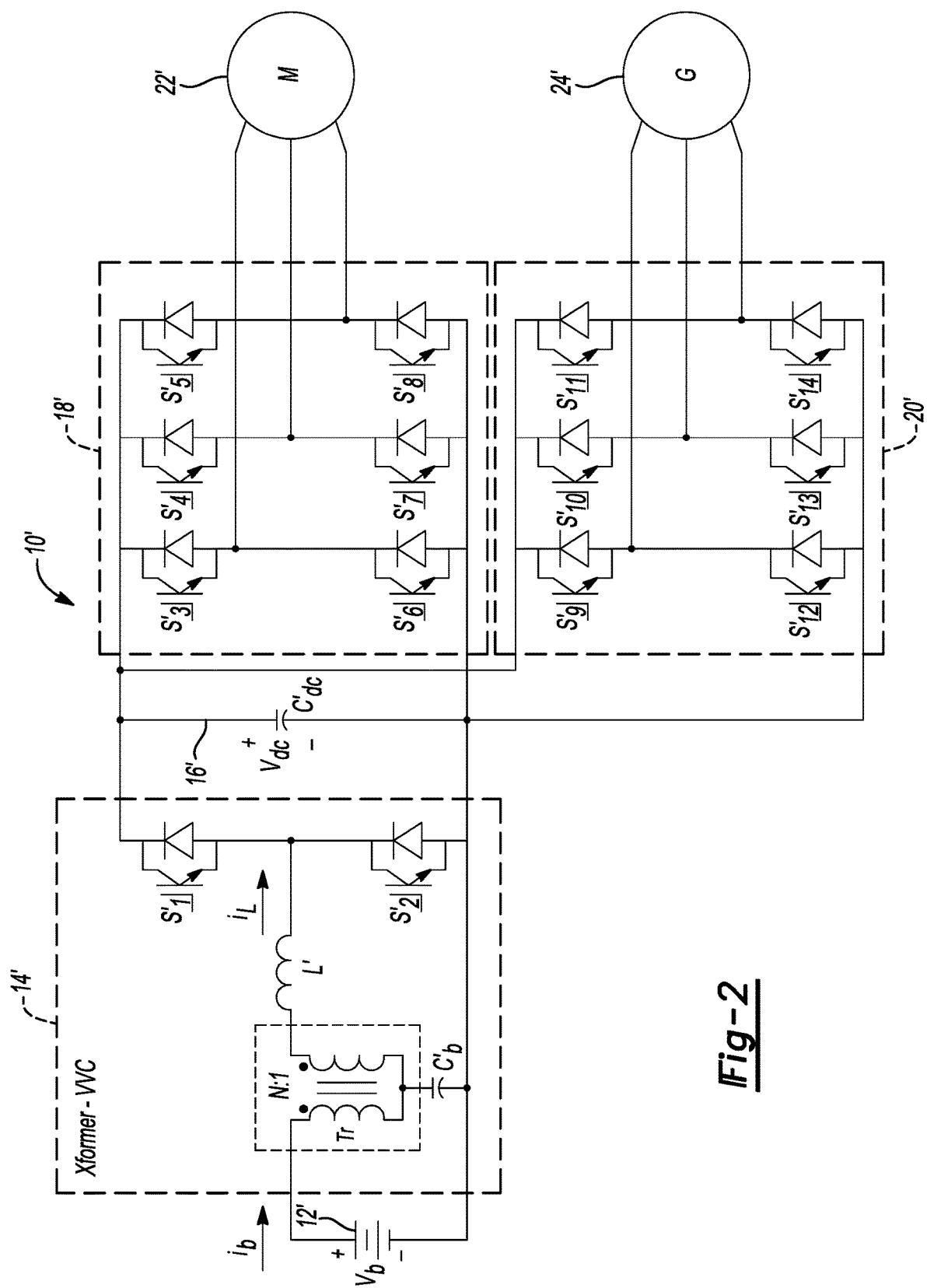
FIGS. 2 and 3 are schematic diagrams of another electric drive system for a hybrid electric vehicle.

Referring to FIG. 2, an electric drive system 10' includes a traction battery 12', transformer-based variable voltage converter 14', DC bus 16', inverters 18', 20', motor 22', and generator 24'. (Motor 22' and generator 24' can collectively be referred to as an electric machine.) The variable voltage converter 14' includes a transformer Tr in series with an input capacitor Cb', and the transformer Tr and input capacitor Cb' are in parallel with the traction battery 12'. The variable voltage converter 14' also includes switches S1', S2', and inductor L' electrically between the transformer Tr and switches S1', S2'. The DC bus 16' includes capacitor Cdc'. The inverter 18' includes switches S3'-S8', and the inverter 20' includes switches S9'-S14'. Thus, the traction battery 12' is connected to the DC bus 16' through the inductor L, transformer Tr, and capacitor Cb'. The transformer Tr has a turn ratio of N:1, which means that battery current ripple (peak-to-peak value Δib) is 1/N of inductor current ripple (peak-to-peak value ΔiL).

Figure 3:
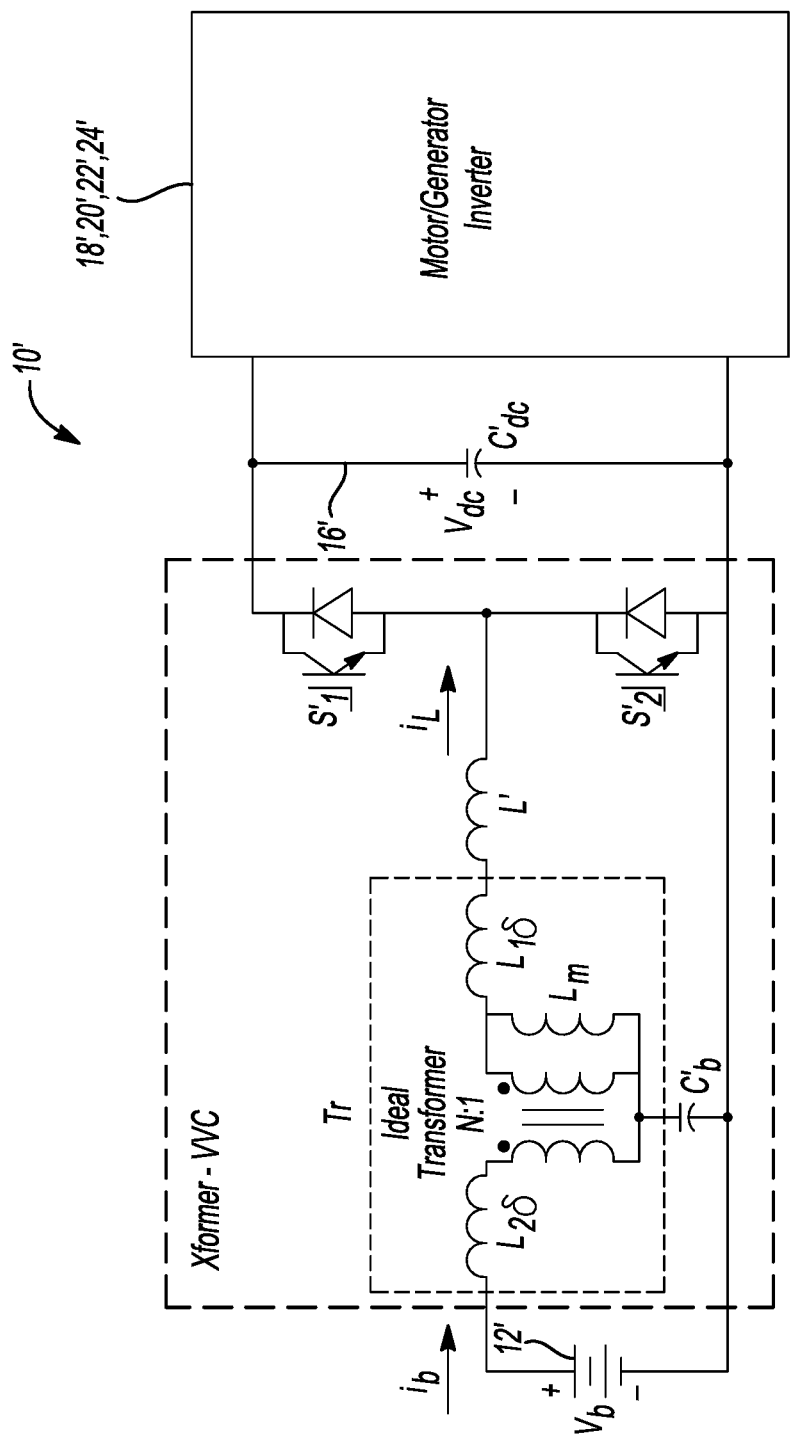

Referring to FIG. 3, the transformer Tr includes equivalent circuit components such as magnetization inductance Lm, and primary and secondary winding leakage inductances L1δ, L2δ. When a large magnetization inductance Lm is used, Δib=ΔiL/N. When a small magnetization inductance Lm is used, ΔiL=NΔib+ΔiLm, where ΔiLm does not flow into the traction battery 12' but only through Lm, so that Δib is far less than ΔiL/N. In other words, the transformer Tr can be quite small even with a small inductor L' and small input capacitor Cb'. The design has an advantage that battery ripple current is always quite low regardless of battery internal impedance.

Simulation was used to compare performance of the variable voltage converter of FIGS. 2 and 3 to the variable voltage converter of FIG. 1. A traction battery voltage of 200 V, a variable voltage duty cycle of 0.308, and a motor inverter with a 60 kW load were assumed for both sets of simulations.

Figure 4A:
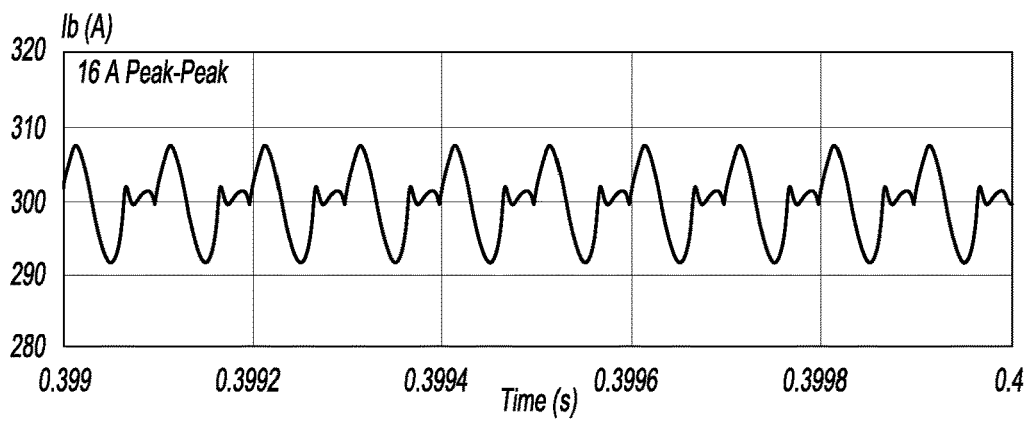
FIGS. 4A, 4B, and 4C are plots of battery current, inductor current, battery voltage, and DC bus voltage versus time for the electric drive system of FIGS. 2 and 3 at battery internal impedance of 3 μH and 0.2Ω.
Figure 4B:
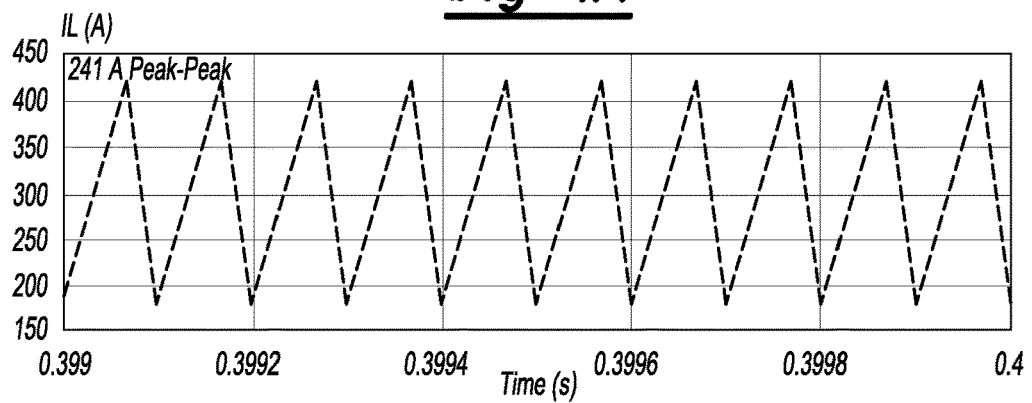
Figure 4C:
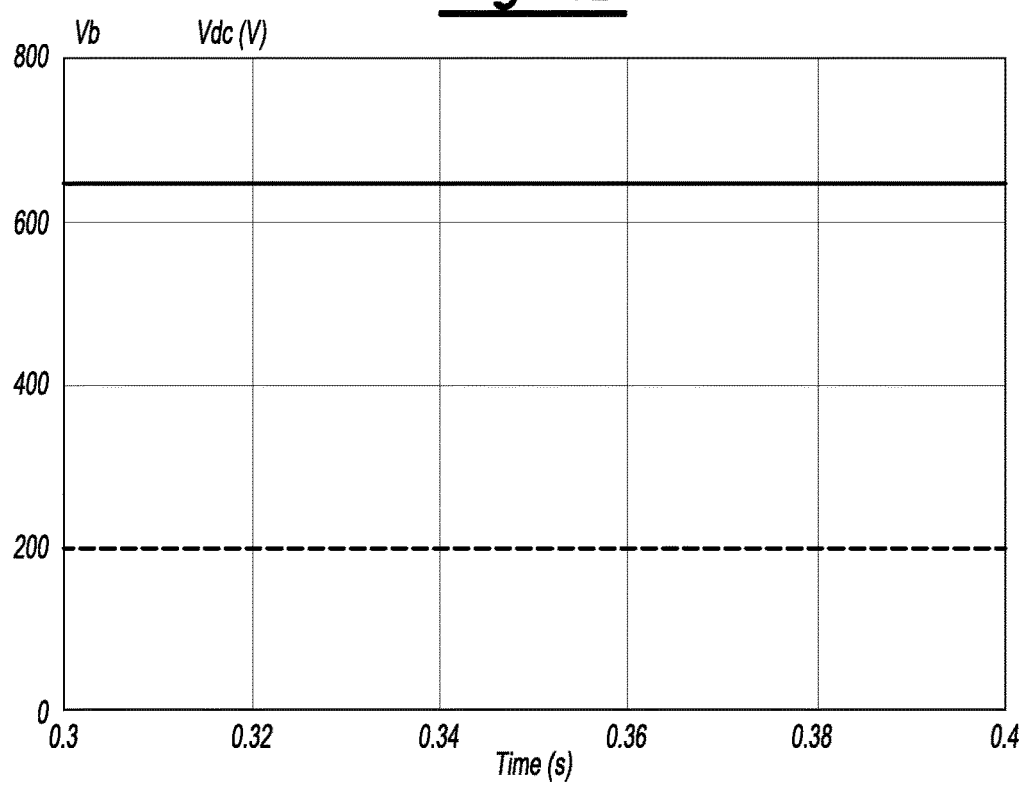
Figure 5A:
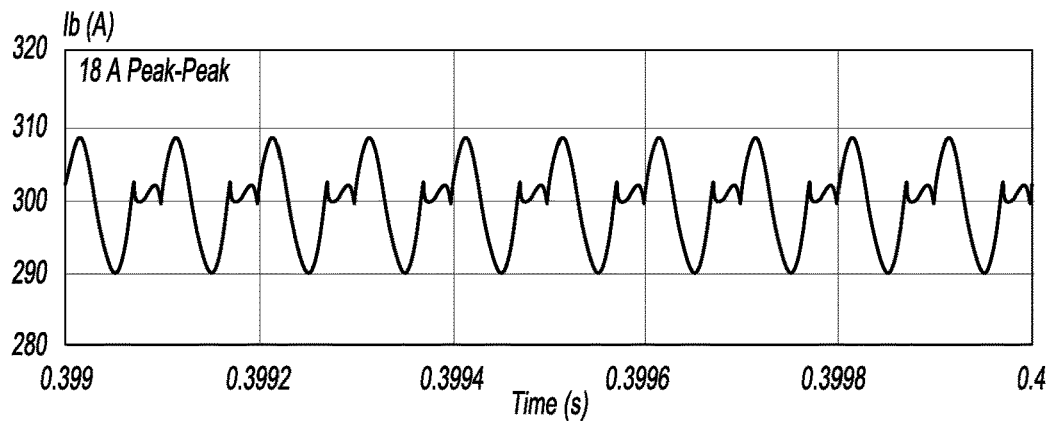
FIGS. 5A, 5B, and 5C are plots of battery current, inductor current, battery voltage, and DC bus voltage versus time for the electric drive system of FIGS. 2 and 3 at battery internal impedance of 0 μH and 0.2Ω.
Figure 5B:
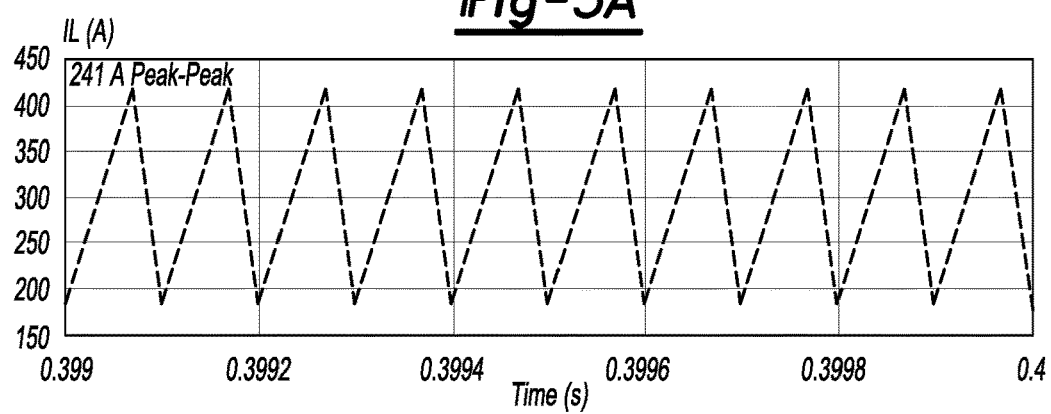
Figure 5C:
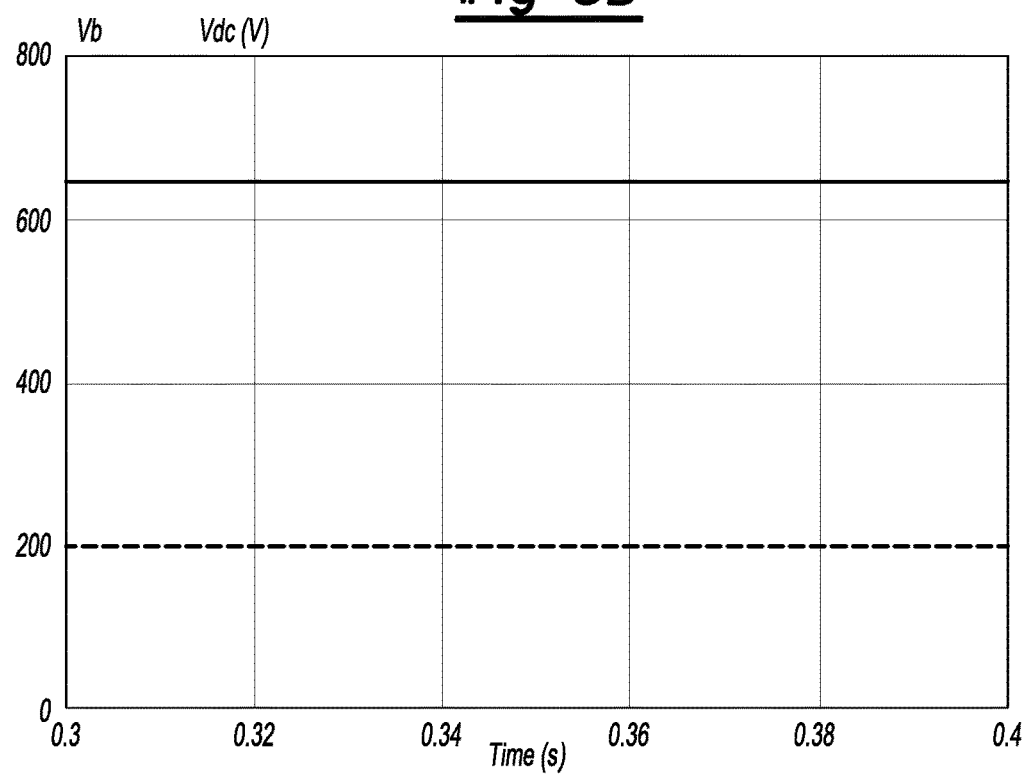
Figure 6A:
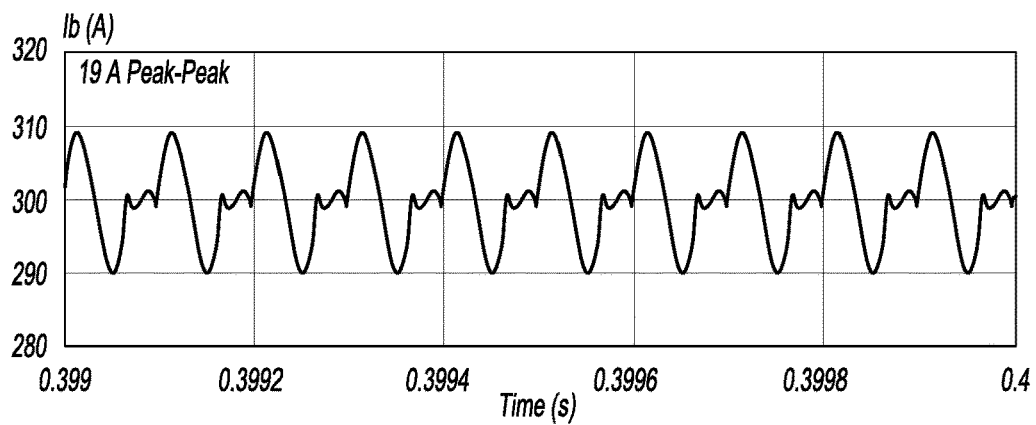
FIGS. 6A, 6B, and 6C are plots of battery current, inductor current, battery voltage, and DC bus voltage versus time for the electric drive system of FIGS. 2 and 3 at battery internal impedance of 0 μH and 0.025Ω.
Figure 6B:
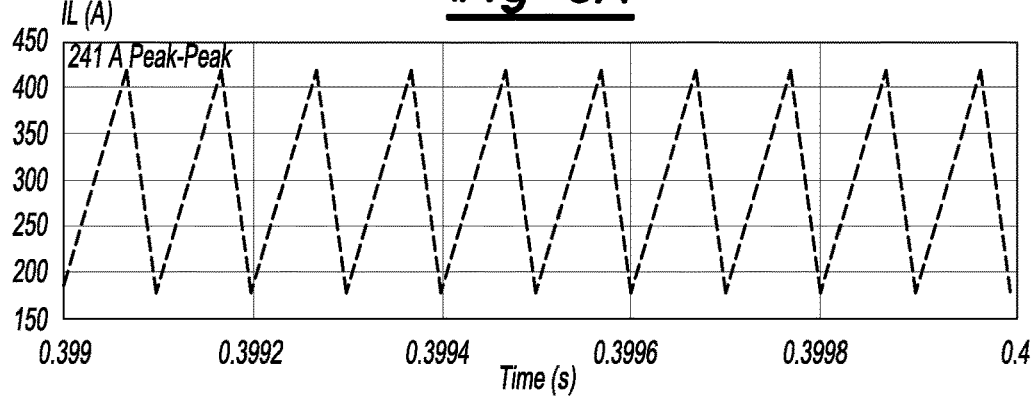
Figure 6C:
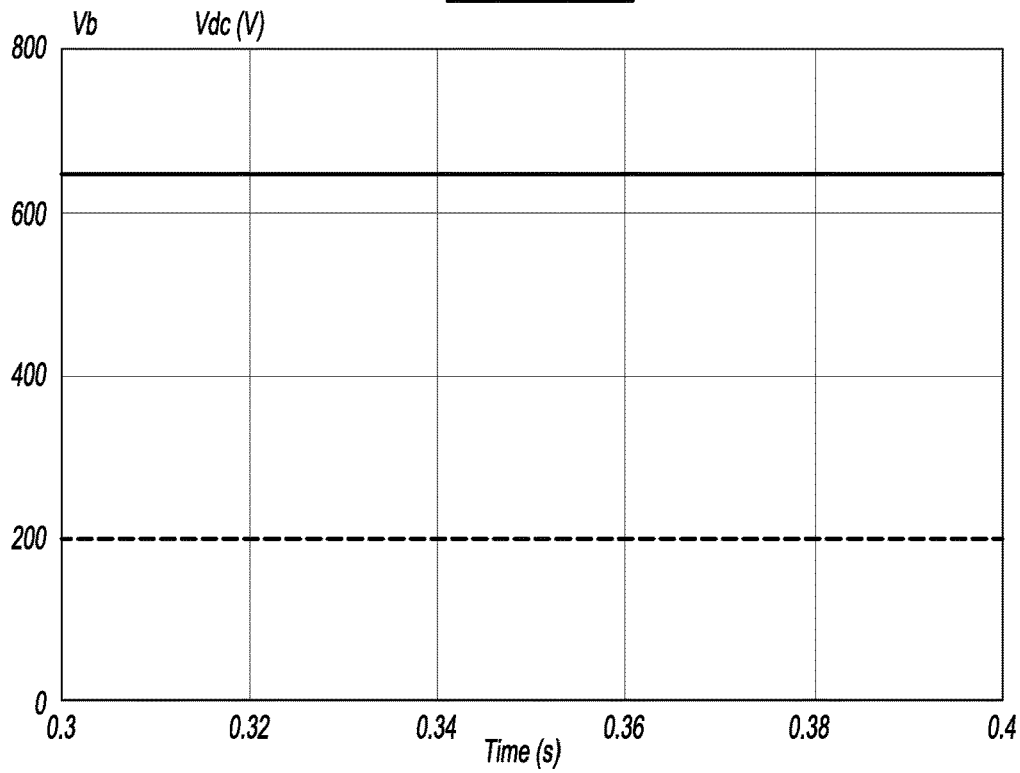

Referring to FIGS. 4A-6C, the parameters are L'=60 µH, Lm=0.8 µH, Cb'=50 µF, and N=5. Three sets of battery internal impedances are used, respectively: FIGS. 4A-4C stray inductance Lb=3 µH and internal resistance Rb=0.2Ω; FIGS. 5A-5C stray inductance Lb=0 µH, and internal resistance Rb=0.2Ω; and FIGS. 6A-6C stray inductance Lb=0 µH and internal resistance Rb=0.025Ω. As apparent to those of ordinary skill, battery ripple current is always in a range of 16 A-19 A peak-peak when battery internal impedance changes from 3 µH and 0.2Ω to 0 µH and 0.025Ω. Thus, as battery resistance changes by an order of magnitude, the peak-to-peak values of battery ripple current change less than 20%. The voltage of the DC bus 16' is boosted to 650 V from 200 V. Average currents of the traction battery 12' and inductor L' are 300 A. Hence, inductance and capacitance are quite small and battery ripple current is low and less affected by battery internal impedance.

Figure 7A:
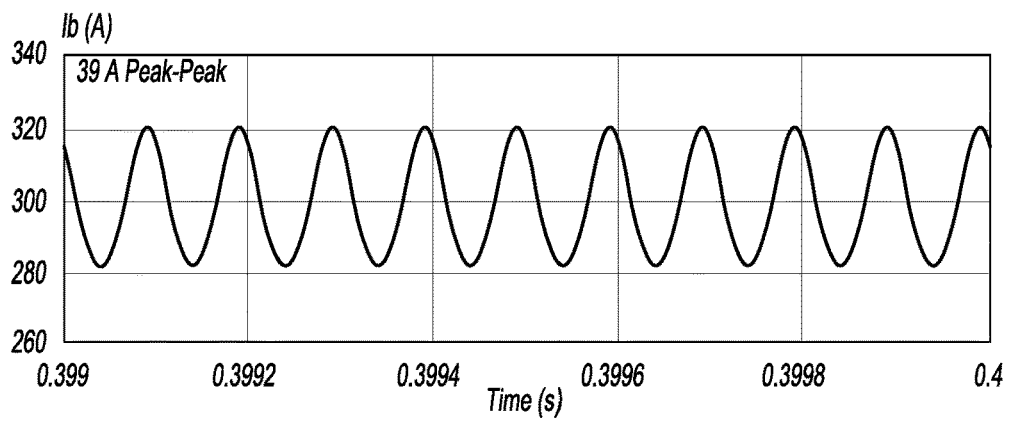
FIGS. 7A, 7B, and 7C are plots of battery current, inductor current, battery voltage, and DC bus voltage versus time for the electric drive system of FIG. 1 at battery internal impedance of 3 μH and 0.2Ω.
Figure 7B:
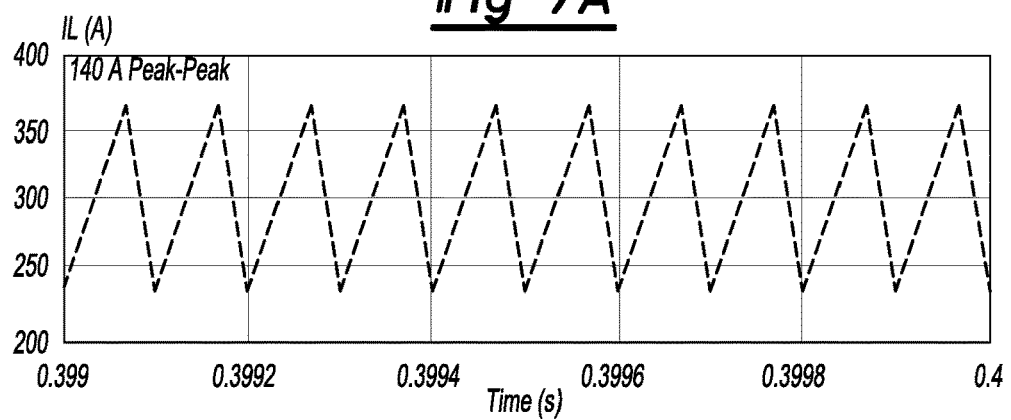
Figure 7C:
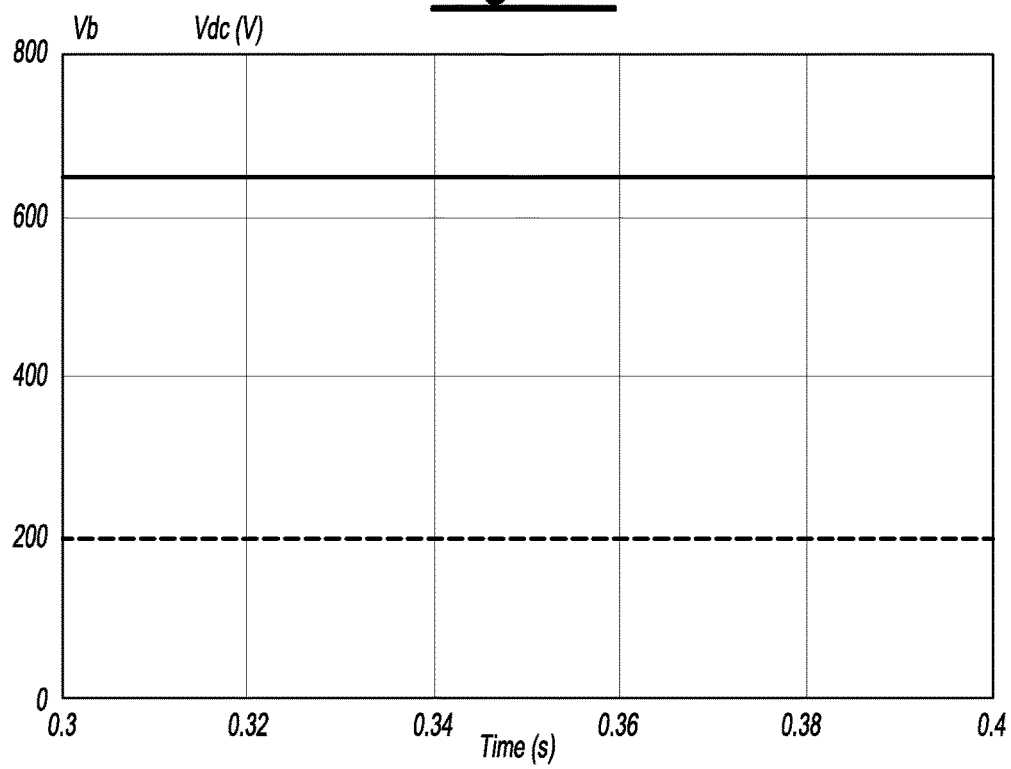
Figure 8A:
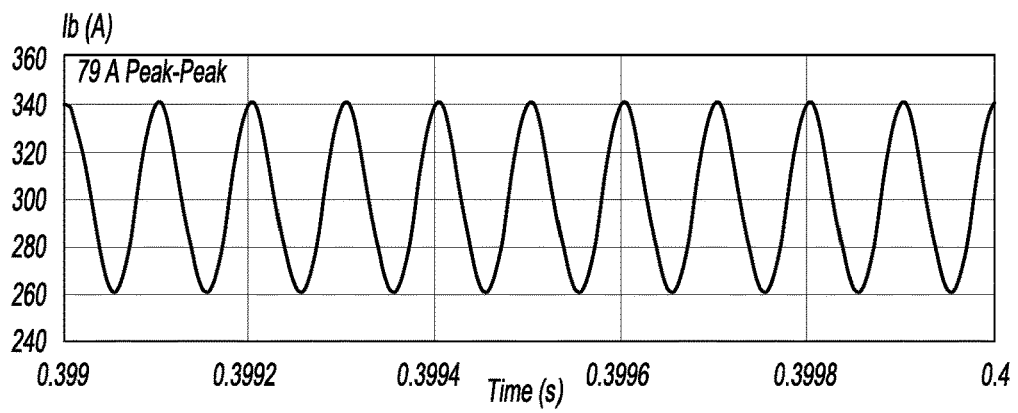
FIGS. 8A, 8B, and 8C are plots of battery current, inductor current, battery voltage, and DC bus voltage versus time for the electric drive system of FIG. 1 at battery internal impedance of 3 μH and 0.025Ω.
Figure 8B:
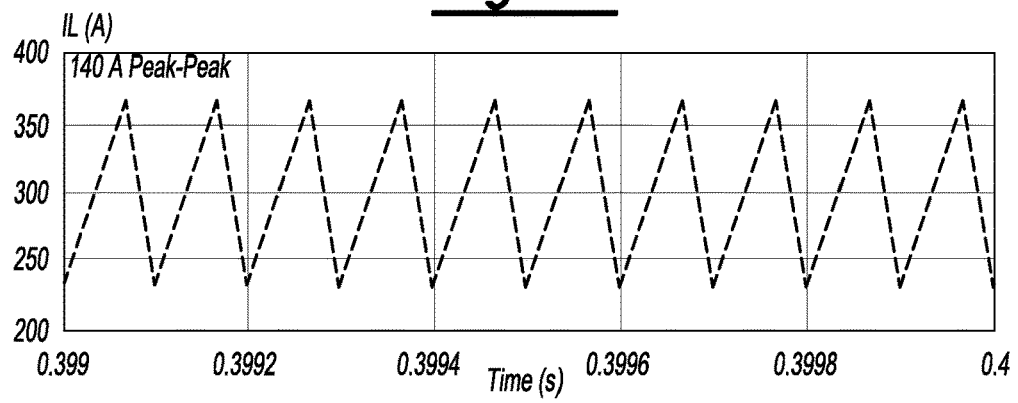
Figure 8C:
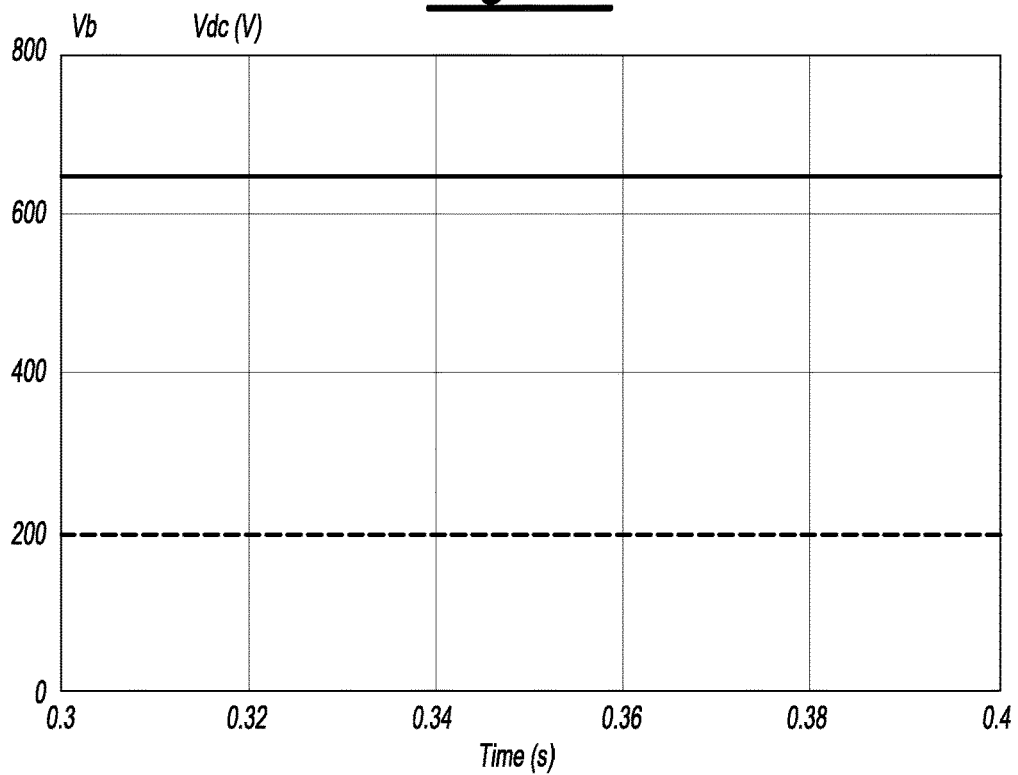
Figure 9A:
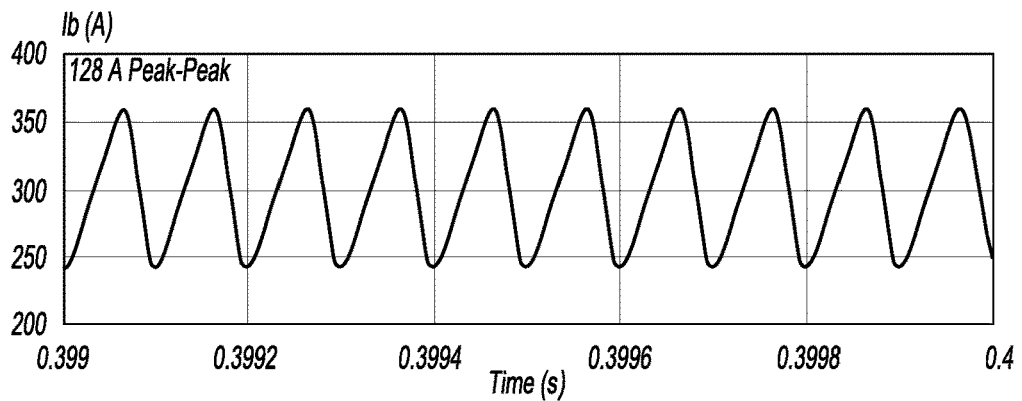
FIGS. 9A, 9B, and 9C are plots of battery current, inductor current, battery voltage, and DC bus voltage versus time for the electric drive system of FIG. 1 at battery internal impedance of 0 μH and 0.025Ω.
Figure 9B:
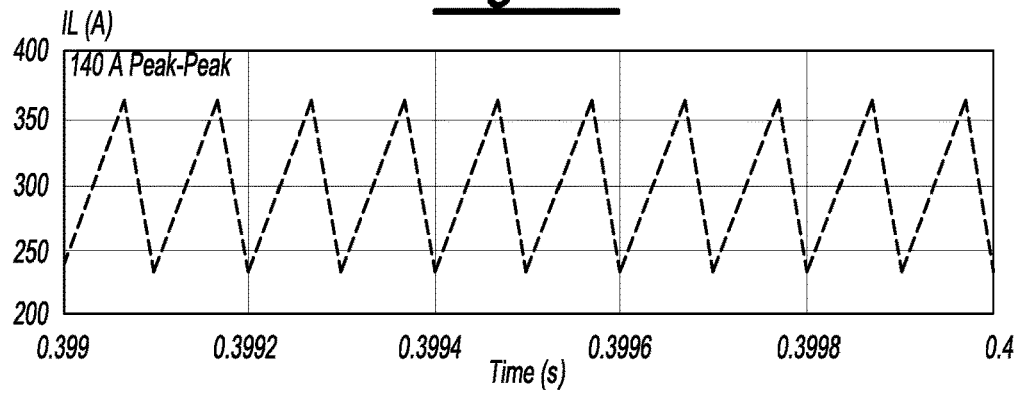
Figure 9C:
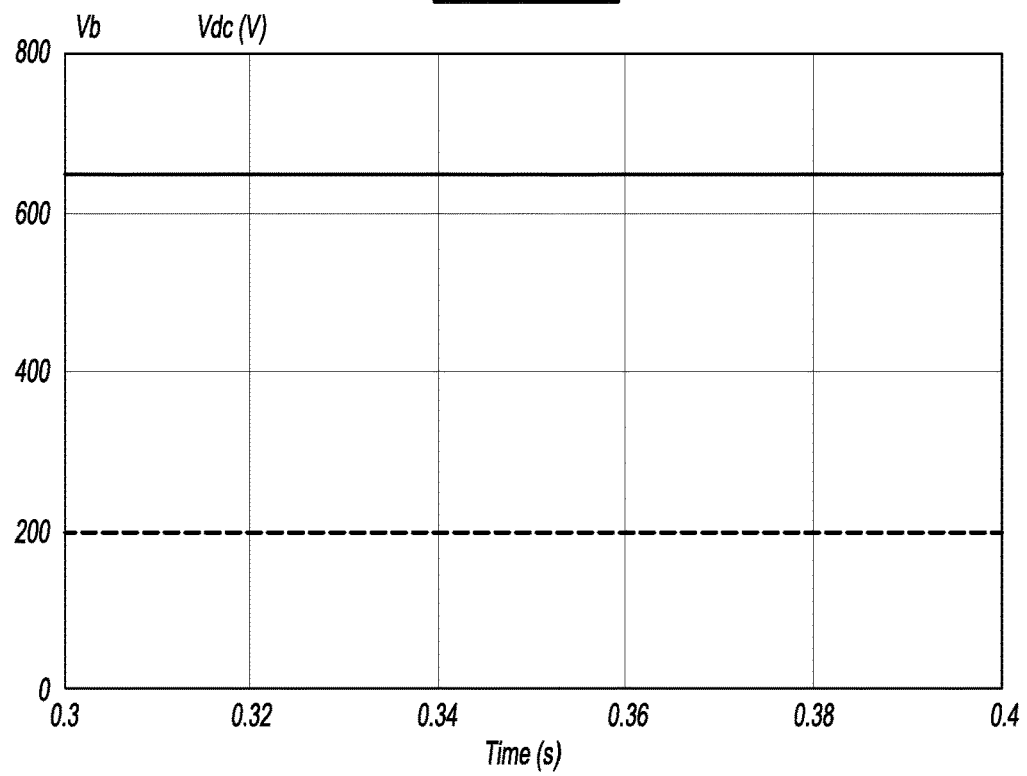

Referring to FIGS. 7A-9C, the parameters are L=100 µH and Cb=200 µF. Three sets of battery internal impedances are used, respectively: FIGS. 7A-7C stray inductance Lb=3 µH and internal resistance Rb=0.2Ω; FIGS. 8A-8C stray inductance Lb=3 µH and internal resistance Rb=0.025Ω; FIGS. 9A-9C stray inductance Lb=0 pH and internal resistance Rb=0.025Ω. Hence, battery ripple current is quite high even though large inductance and large input capacitance are used. Moreover, battery ripple current changes from 39 A peak-peak to 79 A peak-peak when battery internal resistance changes from 0.2Ω to 0.025Ω. If battery stray inductance is zero and internal resistance is 0.025Ω, battery ripple current is 128 A, as shown in FIG. 9A. The voltage of the DC bus 16 is also boosted to 650 V from 200 V. Average currents of the traction battery 12 and inductor L are 300 A.

The transformer Tr can use any kind of magnetic core material, any kind of core shape, any kind of winding turn numbers, and any kind of winding connections. FIGS. 2 and 3 thus show just one example. The proposed designs can be extended to two, three, or multiple-phase interleaved DC-DC converters, where inductors can be coupled or individual. The proposed designs can also be applied to high power and low power areas.

The proposed variable voltage converter topology is different than existing variable voltage topologies. Examples of the proposed variable voltage converter require low inductance, low capacitance, and a small transformer to achieve low traction battery ripple current, whereas existing variable voltage converters need large inductance and large capacitance to limit traction battery ripple current within a required range. Battery ripple current of the proposed variable voltage converter less affected by battery internal impedance, whereas battery ripple current of existing variable voltage converters is significantly affected by battery internal impedance. Examples of the proposed variable voltage converter exhibit low volume, low loss, and low cost. Low volume and low loss make cooling and packaging easier.

Figure 10:
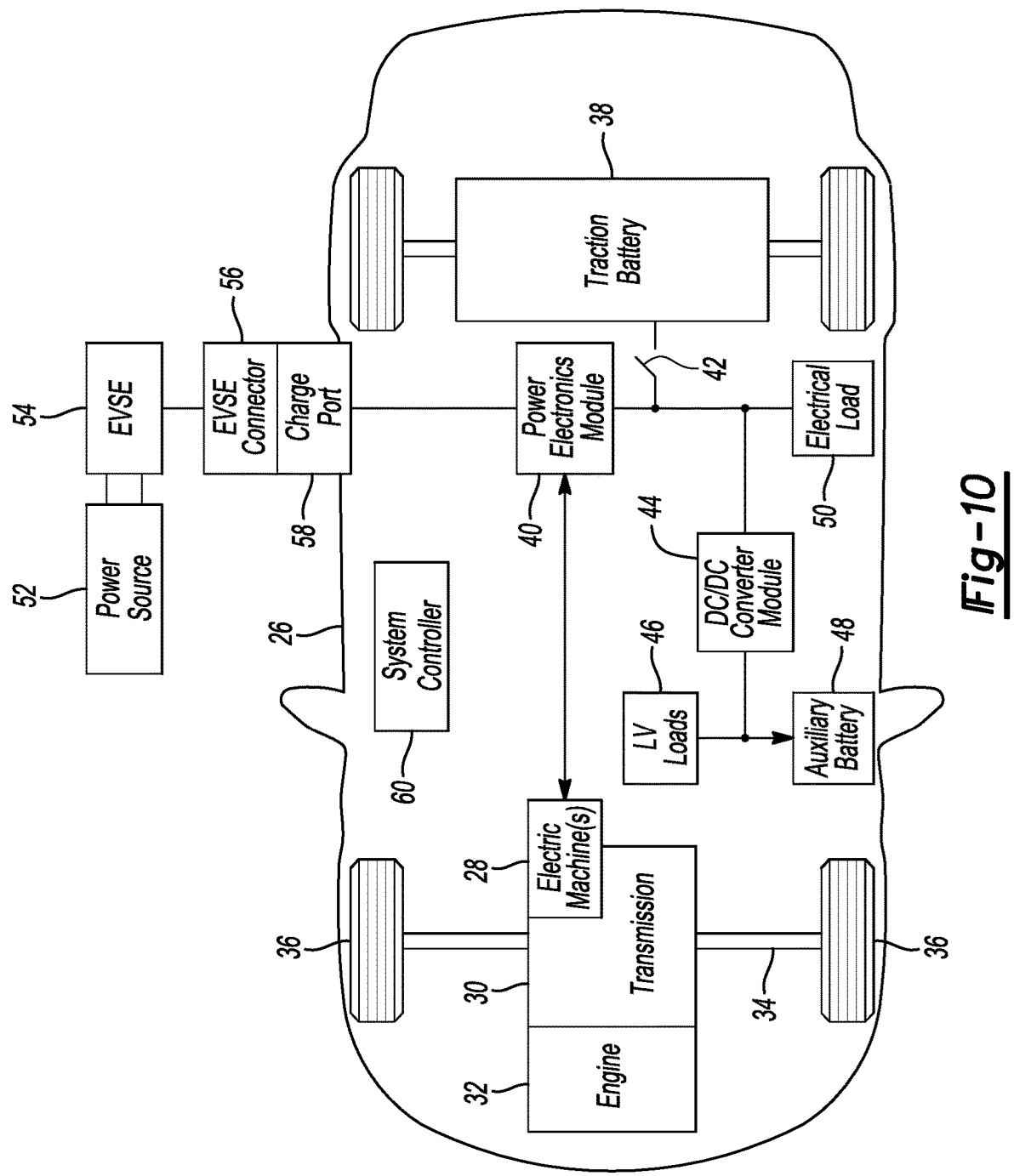
FIG. 10 is a schematic diagram of a vehicle.

The electric drive systems contemplated herein may be implemented within a variety of vehicle modules. FIG. 10, for example, depicts an electrified vehicle 26 with such modules. The electrified vehicle 26 includes one or more electric machines 28 mechanically coupled to a hybrid transmission 30. The electric machines 28 may operate as a motor or generator. In addition, the hybrid transmission 30 is mechanically coupled to an engine 32 and a drive shaft 34 that is mechanically coupled to the wheels 36.

A traction battery or battery pack 38 stores energy that can be used by the electric machines 28. The vehicle battery pack 38 may provide a high voltage direct current (DC) output. The traction battery 38 may be electrically coupled to one or more power electronics modules 40 that implement the variable voltage converter topologies discussed above. One or more contactors 42 may further isolate the traction battery 38 from other components when opened and connect the traction battery 38 to other components when closed. The power electronics module 40 is also electrically coupled to the electric machines 28 and provides the ability to bi-directionally transfer energy between the traction battery 38 and the electric machines 28. For example, the traction battery 38 may provide a DC voltage while the electric machines 28 may operate with alternating current (AC) to function. The power electronics module 40 may convert the DC voltage to AC current to operate the electric machines 28. In regenerative mode, the power electronics module 40 may convert the AC current from the electric machines 28 acting as generators to DC voltage compatible with the traction battery 38.

In addition to providing energy for propulsion, the traction battery 38 may provide energy for other vehicle electrical systems. The vehicle 26 may include a DC/DC converter module 44 that converts the high voltage DC output of the traction battery 38 to a low voltage DC supply that is compatible with low-voltage vehicle loads 46. An output of the DC/DC converter module 44 may be electrically coupled to an auxiliary battery 48 (e.g., 12V battery) for charging the auxiliary battery 48. The low-voltage systems may be electrically coupled to the auxiliary battery 48. One or more electrical loads 50 may be coupled to the high-voltage bus. The electrical loads 50 may have an associated controller that operates and controls the electrical loads 50 when appropriate. Examples of electrical loads 50 may include a fan, an electric heating element, and/or an air-conditioning compressor.

The electrified vehicle 26 may be configured to recharge the traction battery 38 from an external power source 52. The external power source 52 may be a connection to an electrical outlet. The external power source 52 may be electrically coupled to a charger or electric vehicle supply equipment (EVSE) 54. The external power source 52 may be an electrical power distribution network or grid as provided by an electric utility company. The EVSE 54 may provide circuitry and controls to regulate and manage the transfer of energy between the power source 52 and the vehicle 26. The external power source 52 may provide DC or AC electric power to the EVSE 54. The EVSE 54 may have a charge connector 56 for plugging into a charge port 58 of the vehicle 26. The charge port 58 may be any type of port configured to transfer power from the EVSE 56 to the vehicle 26. The EVSE connector 56 may have pins that mate with corresponding recesses of the charge port 58. Alternatively, various components described as being electrically coupled or connected may transfer power using a wireless inductive coupling.

In some configurations, the electrified vehicle 26 may be configured to provide power to an external load. For example, the electrified vehicle may be configured to operate as a back-up generator or power outlet. In such applications, a load may be connected to the EVSE connector 56 or other outlet. The electrified vehicle 26 may be configured to return power to the power source 52. For example, the electrified vehicle 26 may be configured to provide alternating current (AC) power to the electrical grid. The voltage supplied by the electrified vehicle may be synchronized to the power line.

Electronic modules in the vehicle 26 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by the Institute of Electrical and Electronics Engineers (IEEE) 802 family of standards. Additional channels of the vehicle network may include discrete connections between modules and may include power signals from the auxiliary battery 48. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown but it may be implied that the vehicle network may connect to any electronic module that is present in the vehicle 26. A vehicle system controller (VSC) 60 may be present to coordinate the operation of the various components.

The processes, methods, logic, or strategies disclosed may be deliverable to and/or implemented by a processing device, controller, or computer, which may include any existing programmable electronic control unit or dedicated electronic control unit. Similarly, the processes, methods, logic, or strategies may be stored as data and instructions executable by a controller or computer in many forms including, but not limited to, information permanently stored on various types of articles of manufacture that may include persistent non-writable storage media such as ROM devices, as well as information alterably stored on writeable storage media such as floppy disks, magnetic tapes, CDs, RAM devices, and other magnetic and optical media. The processes, methods, logic, or strategies may also be implemented in a software executable object. Alternatively, they may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure and claims. As previously described, the features of various embodiments may be combined to form further embodiments that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle electric drive comprising:
   a battery;
   an electric machine; and
   a variable voltage converter
      including switches, a transformer having a pair of windings sharing a common terminal with a series connected input capacitor, and an inductor electrically between the switches and transformer, the transformer and input capacitor being in parallel with the battery, and
      configured to boost voltage of the battery via operation of the switches.

2. The vehicle electric drive of claim 1, wherein operation of the switches as internal resistance of the battery changes by an order of magnitude results in changes in peak-to-peak values of battery ripple current of less than 20%.

3. The vehicle electric drive of claim 1, wherein one of the pair shares another terminal with the battery.

4. The vehicle electric drive of claim 1, wherein the one has a number of turns greater than the other of the pair.

5. The vehicle electric drive of claim 1, whereon one of the pair shares another terminal with the inductor.

6. A vehicle electric drive comprising:
a battery;
a motor and generator; and
a variable voltage converter electrically between the battery and the motor and generator, and including a series connected transformer and capacitor in parallel with the battery such that operation of the variable voltage converter as internal resistance of the battery changes by an order of magnitude results in changes in peak-to-peak values of battery ripple current of less than 20%.

7. The vehicle electric drive of claim 1, wherein the transformer includes a pair of windings that share a common terminal with the input capacitor.

8. The vehicle electric drive of claim 7, wherein one of the pair shares another terminal with the battery.

9. The vehicle electric drive of claim 8, wherein the one has a number of turns greater than the other of the pair.

10. The vehicle electric drive of claim 7, whereon one of the pair shares another terminal with the inductor.

11. The vehicle electric drive of claim 7, wherein the variable voltage converter includes switches and an inductor electrically between the switches and transformer.

12. A method for operating a vehicle, comprising:
operating a variable voltage converter that is electrically between a battery and an electric machine, and that includes a series connected transformer and capacitor in parallel with the battery such that an order of magnitude change in internal resistance of the battery results in changes in peak-to-peak values of battery ripple current of less than 20%.

13. The method of claim 12, wherein the operating includes activating switches of the variable voltage converter.

14. The method of claim 12, wherein the transformer includes a pair of windings that share a common terminal with the capacitor.

15. The method of claim 14, wherein one of the pair shares another terminal with the battery.

16. The method of claim 15, wherein the one has a number of turns greater than the other of the pair.

* * * * *